United States Patent
Koseoglu

(10) Patent No.: US 11,173,482 B2
(45) Date of Patent: Nov. 16, 2021

(54) COMBUSTION OF SPENT ADSORBENTS CONTAINING HPNA COMPOUNDS IN FCC CATALYST REGENERATOR

(71) Applicant: Saudi Arabian Oil Company, Dhahran (SA)

(72) Inventor: Omer Refa Koseoglu, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 386 days.

(21) Appl. No.: 16/423,968

(22) Filed: May 28, 2019

(65) Prior Publication Data

US 2020/0376478 A1   Dec. 3, 2020

(51) Int. Cl.

| | | |
|---|---|---|
| *B01J 38/12* | (2006.01) | |
| *C10G 47/02* | (2006.01) | |
| *B01J 21/18* | (2006.01) | |
| *B01J 21/20* | (2006.01) | |
| *B01J 38/02* | (2006.01) | |
| *B01J 38/72* | (2006.01) | |

(52) U.S. Cl.
CPC .............. *B01J 38/12* (2013.01); *B01J 21/18* (2013.01); *B01J 21/20* (2013.01); *B01J 38/02* (2013.01); *B01J 38/72* (2013.01); *C10G 47/02* (2013.01); *C10G 2300/701* (2013.01); *C10G 2300/708* (2013.01)

(58) Field of Classification Search
None
See application file for complete search history.

(56) References Cited

U.S. PATENT DOCUMENTS

| | | | |
|---|---|---|---|
| 3,373,102 A * | 3/1968 | Schulman ............... | C10G 11/00 208/91 |
| 4,208,384 A | 6/1980 | Mitchell | |
| 4,447,315 A | 5/1984 | Lamb et al. | |
| 4,954,242 A | 9/1990 | Gruia | |
| 5,589,599 A | 12/1996 | McMullen et al. | |
| 5,626,088 A | 5/1997 | Hiltunen et al. | |
| 7,763,163 B2 | 7/2010 | Koseoglu | |
| 8,828,219 B2 | 9/2014 | Koseoglu | |
| 9,534,179 B2 | 1/2017 | Koseoglu | |
| 2007/0123419 A1 * | 5/2007 | Le Bec ................ | B01J 31/1616 502/416 |
| 2018/0187100 A1 | 7/2018 | Koseoglu | |

FOREIGN PATENT DOCUMENTS

WO    2015/130190 A1    9/2015

* cited by examiner

*Primary Examiner* — Derek N Mueller
(74) *Attorney, Agent, or Firm* — Abelman, Frayne & Schwab

(57) ABSTRACT

Supplemental heat required to raise the temperature of a regenerated catalyst to the minimum required to promote the catalyzed reaction in an FCC unit is provided by introducing adsorbent material containing HPNA compounds and HPNA precursors with the coked catalyst into the FCC catalyst regeneration unit for combustion. The HPNA compounds and HPNA precursors can be adsorbed on either a carbonaceous adsorbent, such as activated carbon, that is completely combustible and generates no ash, or on fresh or coked FCC catalyst that is recovered from an HPNA adsorption column that has treated the bottoms from a hydrocracking unit to remove the HPNA compounds and their precursors.

13 Claims, 1 Drawing Sheet

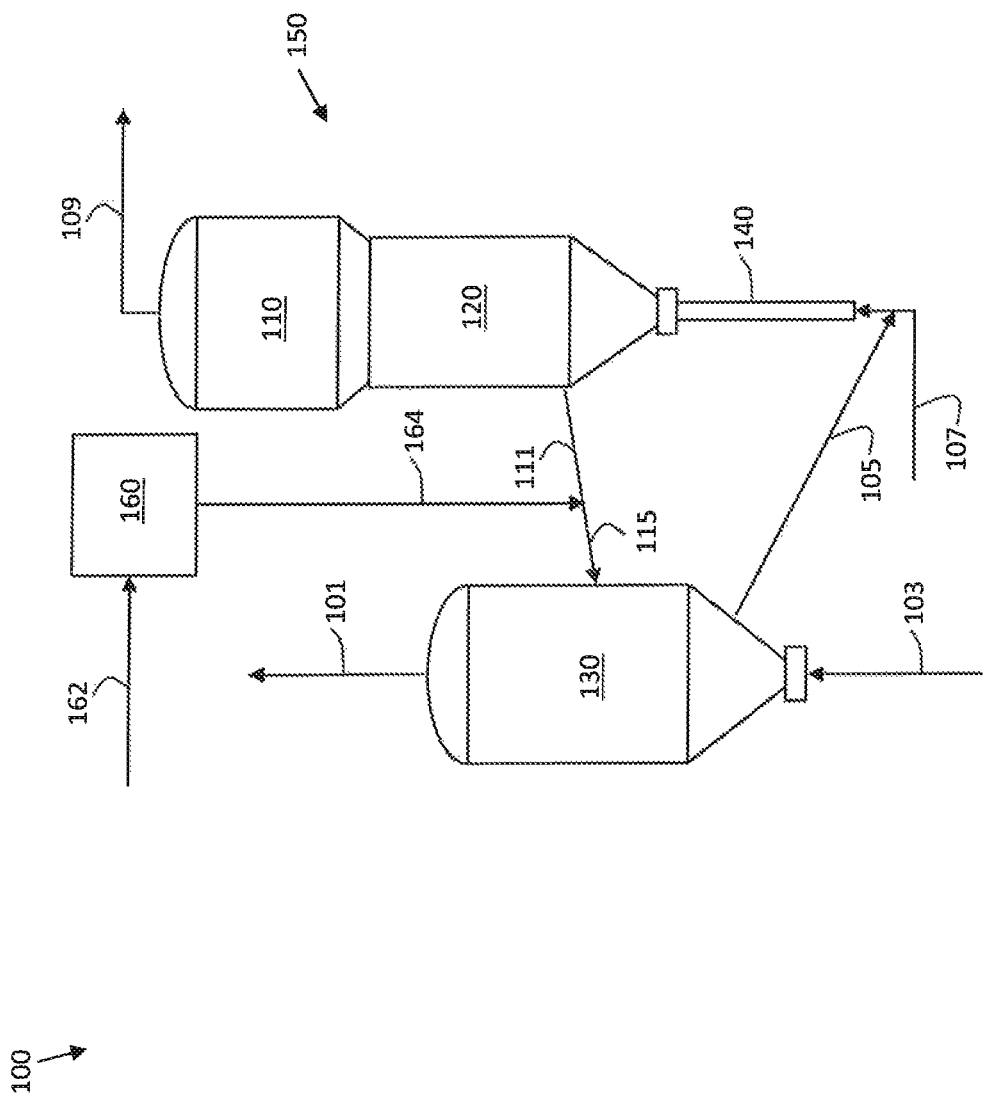

COMBUSTION OF SPENT ADSORBENTS CONTAINING HPNA COMPOUNDS IN FCC CATALYST REGENERATOR

BACKGROUND OF THE INVENTION

Field of the Invention

This invention relates to a process for the environmentally acceptable disposal of spent adsorbent material containing heavy poly nuclear aromatic (HPNA) compounds and HPNA pre-cursor molecules removed from hydrocracking unit bottoms.

Description of Related Art

HPNA Removal from Hydrocracking Bottoms

Hydrocracking processes are widely used commercially in petroleum refineries to process a variety of feeds boiling in the range of 370° C. to 520° C. in conventional hydrocracking units and boiling at 520° C. and above in vacuum residue hydrocracking units. In hydrocracking processes, molecules of the feed are split into smaller ones that are lighter and that have a higher average volatility and economic value. Additionally, hydrocracking processes typically improve the quality of the hydrocarbon feedstock by increasing the hydrogen-to-carbon ratio and by removing organosulfur and organonitrogen compounds. The significant economic benefit derived from hydrocracking processes has resulted in the development of substantial process improvements and more active catalysts.

In addition to sulfur-containing and nitrogen-containing compounds, a typical hydrocracking unit feedstream, such as vacuum gas oil (VGO), contains polynuclear aromatic (PNA) compounds, e.g., those formed of less than seven fused benzene rings. As the feedstream is subjected to hydroprocessing at elevated temperatures and pressures, heavy polynuclear aromatic (HPNA) compounds having seven or more fused benzene rings are formed and are present in high concentration in the unconverted hydrocracker bottoms. For this reason, PNA compounds are commonly referred to as "HPNA precursors", which term will be used below and in the claims.

Heavy feedstreams such as de-metalized oil (DMO) or de-asphalted oil (DAO) have much higher concentrations of nitrogen, sulfur and PNA compounds than VGO feedstreams. These impurities can lower the overall efficiency of the hydrocracking unit by requiring higher operating temperatures, higher hydrogen partial pressure and/or additional reactor/catalyst volume. High concentrations of impurities can also accelerate catalyst deactivation.

Three major hydrocracking process schemes include single-stage once-through hydrocracking, series-flow hydrocracking with or without recycle, and two-stage recycle hydrocracking. Single-stage once-through hydrocracking is the simplest of the hydrocracker configurations and is typically employed at operating conditions that are more severe than hydrotreating processes, and less severe than conventional high pressure hydrocracking processes. It uses one or more reactors for both hydrotreating and the hydrocracking reaction, and the catalyst must be capable of performing both the hydrotreating and hydrocracking steps. This configuration is cost effective, but typically results in relatively low product yields (e.g., a maximum conversion rate of about 60% of the feed). Single-stage hydrocracking is often designed to maximize mid-distillate yield over a single or dual catalyst systems. Dual catalyst systems can be used in a stacked-bed configuration or in two separate reactors. The effluents are passed to a fractionator column to separate the $H_2S$, $NH_3$, light gases ($C_1$-$C_4$), naphtha and diesel products boiling in the temperature range of 36-370° C. The hydrocarbons boiling above 370° C. are unconverted bottoms that, in a single stage system, are passed to other refinery operations.

Series-flow hydrocracking with or without recycle is one of the most commonly used configurations. It uses one reactor containing both hydrotreating and hydrocracking catalysts, or two or more reactors for both the hydrotreating and the hydrocracking reaction steps. Unconverted bottoms from the fractionator column are recycled back into the first reactor for further cracking. This configuration converts heavy crude oil fractions, e.g., vacuum gas oil, into lighter products and has the potential to maximize the yield of naphtha, jet fuel, or diesel, depending on the recycle cut point used in the distillation section.

Two-stage recycle hydrocracking uses two or more reactors and the feedstock is hydrotreated, e.g., hydrodesulfurized and hydrodenitrogenized, and hydrocracked in the first stage. The first-stage effluents are sent to a fractionation column to recover the light gases comprising $C_1$-$C_4$, $H_2S$, $NH_3$, and naphtha and diesel and the unconverted bottoms from the fractionation column are passed to the second stage reactor for further cracking. Since the first reactor accomplishes both hydrotreating and hydrocracking, the feed to the second reactor is virtually free of ammonia and hydrogen sulfide. This permits the effective use of high performance zeolite catalysts which would otherwise be susceptible to poisoning by sulfur or nitrogen compounds.

A typical hydrocracking feedstock is vacuum gas oil boiling in the nominal range of 370° C. to 520° C., and DMO or DAO boiling above 520° C. which can be blended with the vacuum gas oil. For instance, a typical hydrocracking unit processes vacuum gas oils that contain from 10V % to 25V % of DMO or DAO for optimum operation. Under some circumstances, 100% DMO or DAO can also be processed; however, the DMO or DAO streams contain significantly more nitrogen, i.e., 2,000 ppmw vs. 1,000 ppmw, and a higher micro carbon residue (MCR) content of 10 W % vs.<1 W % for the VGO stream.

The DMO or DAO in the blended feedstock to the hydrocracking unit can have the effect of lowering the overall efficiency of the unit, i.e., by requiring higher operating temperatures or greater reactor/catalyst volumes for existing units or higher hydrogen partial pressures or additional reactor/catalyst volumes for the grass-roots units. These impurities can also reduce the quality of the desired intermediate hydrocarbon products in the hydrocracking effluent. When DMO or DAO are processed in a hydrocracker, further processing of the hydrocracking reactor effluents may be required to meet the refinery fuel specifications, depending upon the refinery configuration. When the hydrocracking unit is operating in its desired mode, that is to say, producing products of good quality, its effluent can be utilized in blending and to produce gasoline, kerosene and diesel fuel to meet established fuel specifications.

In addition, formation of HPNA compounds and their precursors is an undesirable side reaction that occurs in recycle hydrocrackers. The HPNA molecules form by the dehydrogenation of larger aromatic molecules or by the cyclization of side chains onto existing HPNAs followed by dehydrogenation, which mechanism is favored as the reaction temperature increases. HPNA formation depends on many known factors including the type of feedstock, catalyst selection, process configuration, and operating conditions.

Since HPNAs accumulate in the recycle system and then cause equipment fouling, concentration of HPNAs and their precursors in the recycle bottoms must be controlled.

Methods known to the art to separate or treat HPNAs include adsorption, hydrogenation, extraction, solvent deasphalting, and bleeding a predetermined portion of the recycle stream for cracking or utilizing the bleed stream elsewhere in the refinery. Hydrocracker bottoms can be treated in separate units to eliminate the HPNA's and the HPNA-free bottoms returned to the hydrocracking reactor.

Lamb, et al. U.S. Pat. No. 4,447,315, the disclosure of which is incorporated herein by reference, describes a single-stage recycle hydrocracking process in which unconverted bottoms are contacted with an adsorbent to remove PNA compounds. Unconverted bottoms having a reduced concentration of PNA compounds are recycled to the hydrocracking reactor.

Gruia U.S. Pat. No. 4,954,242, the disclosure of which is incorporated herein by reference, describes a single-stage recycle hydrocracking process in which an HPNA-containing heavy fraction from a vapor-liquid separator downstream of a hydrocracking reactor is contacted with an adsorbent in an adsorption zone. The heavy fraction with a reduced HPNA concentration is then either recycled to the hydrotreating zone or introduced directly into the fractionation zone.

Adsorption of a DMO or DAO feedstream to a hydrocracking unit to remove nitrogen-containing compounds, sulfur-containing compounds and PNA compounds is described in commonly owned U.S. Pat. No. 7,763,163, the disclosure of which is incorporated herein by reference. This process is effective for removal of impurities, and a separate VGO feedstock is illustrated as the feed to the hydrocracking reactor along with the treated DMO or DAO feed. However, a relatively high concentration of HPNA compounds remains in the unconverted hydrocracker bottoms.

The use of an adsorbent material to reduce the HPNA from hydrocracking recycle stream and HPNA precursors from the hydrocracking feedstock is described in U.S. Pat. Nos. 8,828,219 and 9,534,179, commonly owned, the disclosure of which are incorporated herein by reference. The adsorbent is regenerated and reused in the process until it reaches the end of its life cycle.

The problem addressed by the present disclosure is providing an improved method for the internal disposal of adsorbent materials containing HPNA compounds and HPNA precursors that accumulate in refineries that is both cost effective and beneficial to the efficient operation of the refinery, and that is environmentally acceptable.

FCC Unit Process and Catalyst Regeneration

Conventional fluidized catalytic cracking (FCC) is one of two key conversion processes used in petroleum refineries. It is commonly used to convert the hydrocarbons boiling in the vacuum gas oil range into more valuable gasoline, olefinic gases, and other products. In the FCC process, the feedstock is heated and contacted with a hot catalyst at high temperatures, i.e., at about 500° C. and moderately low pressures, i.e., 1-3 bars. Due to the thermal nature of the reactions, the catalyst cokes during the reaction and must be regenerated in a regeneration unit for reuse in the process. In FCC catalyst regenerators, there is a need for an adequate quantity of coke on the catalyst as it enters the regenerator to produce sufficient heat as the coke is burned off to raise the temperature of the catalyst as it is regenerated to provide the latent heat needed to initiate the cracking of the liquid hydrocarbon feed in the FCC unit's reaction zone. If the catalyst lacks sufficient coke to heat the regenerated catalyst to the required temperature, fuel gas or a liquid fuel must be introduced into the inlet or base of the FCC catalyst regeneration unit as a supplemental heat source to heat the regenerated catalyst to the required temperature, after which the catalyst is separated from the combustion gases and transferred to a retention zone where the temperature is stabilized. The hot regenerated catalyst is then introduced at a controlled rate into the reaction zone and comes into contact with the liquid hydrocarbon feed that is to be cracked. Alternatively, one or more feedstocks containing heavier components can be added to the feedstock blend to increase the amount of coke deposited on the catalyst and thereby satisfy the heat requirement.

A problem addressed by the present disclosure is providing a cost effective and efficient alternative to the liquid and/or gaseous fuels that serve as a supplemental source of heat in the catalyst regeneration unit of an FCC unit.

SUMMARY OF THE INVENTION

The above needs are met and other advantages are provided by the process of the present disclosure that recovers and combusts spent carbon-based adsorbent, typically an activated carbon, recovered from an HPNA removal process or system for disposal of the spent adsorbent and HPNAs in an environmentally responsible manner to generate heat to increase the temperature of the catalyst in an FCC catalyst regeneration unit.

In this process, the combustion of a spent carbon-based adsorbent material feedstream containing HPNA compounds and HPNA precursors in an FCC catalyst regeneration unit to produce heat comprises:

a. separating and drying the spent adsorbent feedstream containing HPNA compounds and HPNA precursors at a temperature in the range of from 20° C. to 80° C.;

b. grinding the dried spent adsorbent containing HPNA compounds and HPNA precursors to produce a free-flowing mass of ground adsorbent particles;

c. introducing the free-flowing mass of ground adsorbent particles into an inlet at the downstream end of the FCC catalyst regeneration unit with coked FCC catalyst, i.e., catalyst with deposited coke;

d. mixing the free-flowing mass of ground adsorbent particles and the coked FCC catalyst particles;

e. combusting the ground adsorbent and coked catalyst mixture with a stream of oxygen-containing gas in the FCC catalyst regeneration unit to produce combustion off-gases and a hot regenerated catalyst particles;

f. separating the off-gases from the hot regenerated catalyst particles; and g. recovering and transferring the hot regenerated catalyst particles from the FCC catalyst regeneration unit to a retention zone upstream of the FCC unit reaction zone.

It is important that the spent or fresh combustible adsorbent employed in the practice of the process of the present disclosure be one that produces no, or substantially no ash upon combustion, i.e., that it be fully combustible. It is to be understood that any solid ash particles remaining at the upper or discharge outlet of the regeneration unit will be carried over with the regenerated catalyst and introduced into the reactor unit where it will interfere with the cracking conversion of the heavy hydrocarbon feed into light reaction products. Eventually, the non-combustible ash particles will build-up in the FCC unit to the point where the efficiency of the unit is so reduced that a shut-down will be required to return the unit to its operational specifications.

A particularly preferred adsorbent is spent activated carbon which is entirely combustible and produces ash-free combustion products.

For convenience, in the description that follows, the designation "HPNA compounds/precursors" will be understood from the context to include HPNA compounds alone or in combination with HPNA precursors.

BRIEF DESCRIPTION OF THE DRAWING

The invention will be described in greater detail below and with reference to the attached drawing, which is a simplified schematic illustration of an embodiment of the present disclosure.

DETAILED DESCRIPTION OF THE INVENTION

Referring now to the schematic illustration of the FIGURE, the process and system according to the present disclosure will be described.

An FCC unit 100 includes a riser reactor with a reactor/separator 150 having a riser portion 140, a reaction zone 120 and a separation zone 110. FCC unit 100 also includes an associated regeneration unit 130 for regenerating the spent catalyst on which coke has been deposited during the cracking of the hydrocarbon feed 107. In an alternative embodiment, not shown, the FCC unit is configured in a downflow reactor scheme.

The hydrocarbon feedstock 107, in some embodiments optionally accompanied by steam or other suitable gas for atomization of the feed (not shown), is admixed and intimately contacted with an effective quantity of heated fresh or regenerated solid cracking catalyst particles which are conveyed via a conduit 105 from regeneration vessel 130.

The feed mixture and the cracking catalyst are contacted under conditions to form a suspension that is introduced into the riser 140. In a continuous process, the mixture of cracking catalyst and hydrocarbon feedstock proceed upward through the riser 140 into reaction zone 120. In riser 140 and reaction zone 120, the hot cracking catalyst particles catalytically crack the relatively larger hydrocarbon molecules by carbon-carbon bond cleavage.

During the reaction, as is conventional in FCC operations, the cracking catalysts become coked and hence access to the active catalytic sites becomes limited or is completely blocked. Reaction products enter what is generally referred to as the separation zone 110 in FCC unit 100, for instance, located at the top of the reactor 150 above the reaction zone 120 where they are separated from the coked catalyst. The separation zone includes any suitable apparatus known to those of ordinary skill in the art such as, for example, one or more cyclones. The reaction product is withdrawn through conduit 109.

Spent adsorbent containing HPNA/precursors 162 is processed in adsorbent preparation unit 160 for drying and grinding to produce a free-flowing ground adsorbent stream 164. As will be understood by one of skill in the art, when the spent adsorbent is to be removed from the unit operation, it is washed with a solvent and then flashed to recover most of the solvent solution. Thereafter, the spent adsorbent is dried to the extent necessary to permit grinding. Although some liquid solvent may be entrained in the pores, the ground adsorbent will be substantially dry and free-flowing free flowing within the context of this disclosure.

Catalyst particles containing coke deposits from the fluidized cracking of the hydrocarbon feedstock pass from the separation zone 120 through a conduit 111 and are mixed with the free-flowing ground adsorbent stream 164 to produce adsorbent and spent catalyst mixture 115. The adsorbent and spent catalyst mixture 115 is passed to regeneration zone 130.

In regeneration zone 130, ground adsorbent and spent catalyst mixture 115 comes into contact with a stream of oxygen-containing gas, e.g., pure oxygen or air, which enters regeneration zone 130 via a conduit 103. Combustion occurs in regeneration zone 130. The regeneration zone 130 is operated in a configuration and under conditions that are well known in FCC unit operations. For instance, regeneration zone 130 can operate as a fluidized bed to produce regeneration off-gas comprising combustion products which are separated from the catalyst and discharged through a conduit 101. The hot regenerated catalyst is transferred from regeneration zone 130 to an accumulation zone for stabilization of the temperature and then via conduit 105 for controlled introduction into the riser FCC reactor 140 for admixture with the hydrocarbon feedstock as described above.

Suitable spent adsorbent materials can include adsorbents such as activated carbon, carbon-based nanofibers and foams, and other combustible adsorbent materials that will be converted to gaseous combustion products and leave substantially no ash or particulate matter that would be passed with the regenerated FCC catalyst exiting the regeneration zone 130. If the adsorbent is not fully combustible and as is produced, it will mix with the catalyst and be passed from the regeneration zone 130 into the reactor and retained in the system where it could accumulate as an undesirable solid waste product.

In other embodiments, fresh or spent FCC catalyst can be used as the adsorbent to adsorb HPNA compounds and HPNA precursors. When the FCC catalyst saturated with HPNA/precursors are introduced into the regeneration zone 130 with the coked FCC catalyst, the HPNA and HPNA precursors will be fully combusted providing additional regenerated catalyst to the system. The continuous movement of the catalyst permits catalyst to be withdrawn and replaced without interruption of the operation and the production of the FCC unit product stream.

In one embodiment, a suitable a fluidized catalytic cracking unit 100 can be similar to that described in U.S. Pat. Nos. 7,312,370, 6,538,169, and 5,326,465, the disclosure of which are incorporated herein by reference. In general, the operating conditions for the reactor of a suitable riser fluidized catalytic cracking unit 100 include:

reaction temperatures (° C.) of from about 480-650, 480-620, 480-600, 500-650, 500-620, or 500-600;

reaction pressures (bar) of from about 1-20, 1-10, or 1-3;

contact time (in the reactor, seconds) of from about 0.1-10, 0.5-5, 0.5-2, 1-10, 1-5, or 1-2; and a catalyst-to-feed ratio of about 1:1 to 15:1, 1:1 to 10:1, 1:1 to 20:1, 8:1 to 20:1, 8:1 to 15:1, or 8:1 to 10:1.

The catalyst used in the process described herein can be any conventional known or future developed catalysts suitable for use in FCC processes, such as zeolites, silica-alumina, carbon monoxide burning promoter additives, bottoms cracking additives, light olefin-producing additives and any other catalyst additives developed for use in the FCC process. In certain embodiments, suitable cracking zeolites in the FCC process include zeolites Y, REY, USY, and RE-USY. For enhanced naphtha cracking potential, a preferred shaped selective catalyst additive can be employed, such as those used in FCC processes to produce light olefins and increase FCC gasoline octane is ZSM-5 zeolite crystal or other pentasil type catalyst structure. This ZSM-5 additive can be mixed with the cracking catalyst zeolites and matrix structures in conventional FCC catalyst and is particularly suitable to maximize and optimize the cracking of the crude oil fractions in the downflow reaction zones.

The spent adsorbent containing HPNA compounds and HPNA precursors can be separated and dried using mesh segregation, gradient or centrifugal separation, cyclone separation, and other known segregation techniques.

The dried spent adsorbent compounds can be ground using blasting, pulverization, milling and/or other known grinding techniques. The particles are ground to pass through a 35 Tyler mesh size screen.

Suitable feedstreams for the hydrocarbon feed 107 include, but are not limited to, vacuum gas oil boiling in the range of from 370° C. to 565° C., a demetallized oil stream boiling above 520° C. or in some embodiments boiling above 565° C., an atmospheric residue stream boiling above 370° C., hydrotreated versions of the previous streams, or combinations thereof.

The ground adsorbent particles are mixed with the spent FCC catalyst in a weight ratio in a range of from 0.00001:10 to 1:10, from 0.00001:10 to 0.1:10, or from 0.1:10 to 1:10.

EXAMPLES

Heat "Q" values in units of BTU/lb for the following examples were, calculated from the Dulong correlation (Selvig, W. A. and Gibson, F. H., "Calorific Value of Coal," in Lowry, H. H., ed., Chemistry of Coal Utilization 1, 139. New York: John Wiley, 1945) in accordance with the following formula:

$$Q=145.44*C(W\%)+620.28*H(W\%)+40.5*S(W\%)-77.54*O(W\%),$$

where Q is the gross heat of combustion in BTU/lb on a dry basis and C, H, S, and O are the respective weight percentages of carbon, hydrogen, sulfur, and oxygen, also on a dry basis, i.e., moisture free.

Example 1

A 100 kg sample of a fresh activated carbon adsorbent, free of HPNA compounds and HPNA precursors, was combusted in an FCC regenerator. The activated carbon containing no HPNA compounds generated 3.19 MMBTU heat in the regenerator.

Example 2

A 100 kg sample of a spent activated carbon adsorbent saturated with 30 kg of HPNA/precursors, i.e., for a total weight sample of 130 kg, was combusted in an FCC regenerator. The HPNA/precursors as adjusted to 100 W % basis comprised 89.52 W % carbon and 10.48 W % hydrogen. The spent adsorbent sample generated 3.45 MMBTU heat in the regenerator.

Example 3

A 100 kg sample of a spent activated carbon adsorbent containing 50 kg of HPNA/precursors, i.e., for a total weight sample of 150 kg, was combusted in an FCC regenerator. The HPNA/precursors comprised 89.52 W % carbon and 10.48 W % hydrogen. The adsorbent generated 3.58 MMBTU heat in the FCC regenerator.

These results shown above confirm that the addition of an activated carbon adsorbent containing HPNA/precursors effectively increases the amount of heat generated in an FCC regenerator while also disposing of the HPNA/precursors in an environmentally acceptable manner.

The process of the present invention has been described above and in the attached figures; process modifications and variations will be apparent to those of ordinary skill in the art from this description and the scope of protection for the invention is to be defined by the claims that follow.

I claim:

1. An integrated process for the combustion of an ash-free carbon-based spent adsorbent material containing HPNA compounds and HPNA precursors in an FCC catalyst regeneration unit to produce supplemental heat comprises:
   a. separating and drying the spent adsorbent material containing HPNA compounds and HPNA precursors recovered from an adsorbent column used to treat hydrocracking unit bottoms at a temperature in the range of from 20° C. to 80° C.;
   b. grinding the dried spent adsorbent material containing HPNA compounds and HPNA precursors to produce a free-flowing mass of ground adsorbent particles;
   c. introducing the free-flowing mass of ground adsorbent particles into the inlet of the FCC catalyst regeneration unit with coked FCC catalyst recovered downstream of the FCC reactor;
   d. combusting the ground adsorbent particles and coked catalyst mixture with a stream of oxygen-containing gas in the FCC catalyst regeneration unit to produce a sufficient quantity of hot gases to raise the temperature of the regenerated catalyst to the minimum temperature required in the FCC reactor;
   e. separating the gases from the hot regenerated catalyst; and
   f. transferring the hot regenerated catalyst from the FCC catalyst regeneration unit to a regenerated catalyst retention zone.

2. The process of claim 1 which includes mixing the free-flowing mass of ground adsorbent particles and the spent FCC catalyst to form a ground adsorbent particles and coked catalyst mixture.

3. The process of claim 1, wherein separating and drying the spent adsorbent containing HPNA compounds and HPNA precursors is carried out by mesh segregation, gradient or centrifugal separation, or cyclone separation.

4. The process of claim 1, wherein grinding the dried spent adsorbent containing HPNA compounds and HPNA precursors is by blasting, pulverization, or milling.

5. The process of claim 1, wherein the free-flowing mass of ground adsorbent particles passes through a 35 Tyler mesh screen.

6. The process of claim 1, wherein the weight ratio of ground adsorbent particles-to-spent FCC catalyst is in the range of from 0.00001:10 to 1:10.

7. The process claim 1, wherein a hydrocarbon feed selected from the group consisting of vacuum gas oil boiling in the range of from 370° C. to 565° C., demetallized oil boiling above 520° C., atmospheric residue boiling above 370° C., hydrotreated versions of the previous streams, and combinations thereof is admixed with the hot regenerated catalyst stream from the regeneration unit.

8. The process of claim 1, wherein the hot regenerated catalyst is selected from the group consisting of zeolites, silica-alumina, carbon monoxide burning promoter additives, bottoms cracking additives, and light olefin-producing additives.

9. The process of claim 1, wherein the oxygen-containing gas is air.

10. The process of claim 1, wherein the oxygen-containing gas is substantially pure oxygen.

11. In an FCC unit operation, a process for producing supplemental heat to raise the temperature of regenerated FCC catalyst discharged from the FCC unit catalyst regenerator to a predetermined minimum FCC reaction temperature where insufficient heat is produced by combusting the coke on the FCC catalyst entering the regenerator, the process comprising:
   a. recovering from an HPNA separation column an FCC catalyst that contains HPNA compounds/precursors adsorbed from a hydrocracking unit bottoms stream;
   b. drying the recovered FCC catalyst to produce flowable FCC catalyst particles containing adsorbed HPNA compounds/precursors;
   c. introducing the flowable catalyst particles containing HPNA compounds/precursors into the intake inlet of the FCC catalyst regeneration unit with coked FCC catalyst and a stream of oxygen-containing gas;
   d. combusting the coke and the HPNA compounds/precursors in the regeneration unit to regenerate the catalyst and to produce a sufficient quantity of hot combustion gases to raise the temperature of the regenerated catalyst to the required minimum reaction temperature for introduction to the FCC reactor.

12. The process of claim 2, wherein the free-flowing mass of ground adsorbent particles passes through a 35 Tyler mesh screen.

13. The process of claim 2, wherein the weight ratio of ground adsorbent particles-to-spent FCC catalyst is in the range of from 0.00001:10 to 1:10.

* * * * *